United States Patent [19]

Boyer

[11] Patent Number: 4,882,845

[45] Date of Patent: Nov. 28, 1989

[54] GYROSCOPIC ARTIFICIAL HORIZON

[75] Inventor: Francis Boyer, Yvelines, France

[73] Assignee: Societe Francaise d'Equipements pour la Navigation Aerienne S.F.E.N.A., Villacoublay, France

[21] Appl. No.: 251,374

[22] Filed: Sep. 28, 1988

Related U.S. Application Data

[63] Continuation of Ser. No. 77,679, Jul. 22, 1987, abandoned.

[30] Foreign Application Priority Data

Jul. 25, 1986 [FR] France .............................. 86 10804

[51] Int. Cl.$^4$ .............................................. G01C 19/38
[52] U.S. Cl. ...................................... 33/328; 340/973
[58] Field of Search ..................... 33/328, 329, 324; 340/976, 977, 973, 974, 975

[56] References Cited

U.S. PATENT DOCUMENTS

| | | | |
|---|---|---|---|
| 4,198,635 | 4/1980 | Gell, Jr. .............................. | 33/324 X |
| 4,247,843 | 1/1981 | Miller et al. ........................ | 340/973 |
| 4,458,426 | 7/1984 | O'Connor et al. ................... | 33/325 |
| 4,583,094 | 4/1986 | Mosier ................................ | 340/973 |
| 4,663,627 | 5/1987 | Dennis ................................ | 340/975 |

Primary Examiner—William D. Martin, Jr.
Attorney, Agent, or Firm—Browdy and Neimark

[57] ABSTRACT

A gyroscopic artificial horizon comprises a gyroscope suspended in a gimbal mount which has an inner frame and an outer frame pivoted, one within the other, about two orthogonal axes. It also comprises a device for sensing the spatial position of the axis of the gyroscope and for displaying this position in the form of an artificial horizon. To simplify the mechanical structure and to increase the reliability of the gyroscopic artificial horizon, the device for sensing and displaying the spatial position of the gyroscope axis comprises a luminous display screen rotationally coupled to the outer frame of the gimbal mount. It further comprise a sensor for sensing the angular position of the inner frame relative to the outer frame and a processor device adapted to display this angular position on the screen in the form of an artificial horizon.

11 Claims, 4 Drawing Sheets

GYROSCOPIC ARTIFICIAL HORIZON

This application is a continuation of application Ser. No. 077,679, filed July 22, 1987.

BACKGROUND OF THE INVENTION

1. Field of the Invention

The present application concerns a gyroscopic attitude indicator of the kind comprising a gyroscope suspended in a gimbal mount comprising inner and outer frames articulated one within the other about two orthogonal axes and means for sensing the spatial position of the axis of the gyroscope and for displaying this position in the form of an artificial horizon.

2. Description of the Prior Art

Longitudinal and lateral attitude indicators, usually called "artificial horizons", are well-known in aviation.

It is well known that when an aircraft begins to nose dive by rotating about its pitch axis the horizon, if the pilot can see it, tends to "rise" in his field of view. On the other hand, when the aircraft begins to pull up, the horizon tends to "fall" in the pilots field of view. Similarly, when the aircraft begins to roll, to the left for example, if the pilot can see the horizon it begins to rotate clockwise in his field of view while when the aircraft begins to roll to the right the horizon begins to rotate in the opposite direction.

It is also well known that when the aircraft begins a combined movement about its pitch and roll axes there results a combined movement of the horizon in the visual field of the pilot in the directions mentioned above.

The longitudinal and lateral attitude indicator is positioned on the instrument panel so as to be clearly visible to the pilot or pilots, its function being to display a dynamic image representing the horizon and the silhouette of the aircraft relative to the horizon as the aircraft performs simple or composite movements about its pitch and/or roll axis. Thus if the real horizon is not visible, because of the height at which the aircraft is flying or because of restricted or zero visibility, the pilot can tell the lateral and longitudinal attitude of the aircraft at a glance from the artificial horizon.

There are various families of methods available for creating a dynamic image showing in a schematic way the movement of an artificial horizon relative to the schematic representation of an aircraft. The method to which the present invention relates is one of those subsumed under the heading "gyroscopic artificial horizons".

Generally speaking, a gyroscopic artificial horizon comprises:

a gyroscope consisting for the main part of a mass rotated by a motor at very high speed (several thousand revolutions per minute), the axis of rotation of this mass being the axis of the gyroscope, erector means adapted to maintain the axis of the gyroscope as close as possible to a vertical line through the point over which the aircraft carrying the gyroscopic artificial horizon is flying, means for sensing the position of the gyroscope axis in space and means for displaying this position in the form of an artificial horizon.

In one embodiment of a gyroscopic artificial horizon known from French Pat. No. 1 142 614 and meeting the above definition the gyroscope is suspended in a gimbal mount comprising two frames articulated the one within the other about two orthogonal axes. The gyroscopic artificial horizon is mounted on the instrument panel of the aircraft in such a way that the rotation axis of the outer frame is parallel to the roll axis of the aircraft. The display means comprise a partially truncated sphere resembling in its overall shape a barrel. This "spherical barrel" is adapted to rotate about its longitudinal axis of symmetry and is mounted on an appropriate structure such that this longitudinal axis of symmetry is parallel to the rotation axis of the inner frame carrying the gyroscope. As a result, the rotation axis of the display barrel is perpendicular to the axis of the gyroscope and, by virtue of the erector means mentioned previously, when the gyroscope is operating the axis of rotation of the barrel remains perpendicular to the direction of the vertical line through the geographic point over which the aircraft is flying.

In this embodiment the gyroscopic artificial horizon comprises a toothed wheel constrained to rotate with the inner frame, about the axis about which the inner frame rotates relative to the outer frame. It meshes indirectly with a toothed wheel constrained to rotate with the display barrel around its longitudinal axis of symmetry so that when angular displacement of the inner frame relative to the outer frame occurs in one direction the display barrel rotates in the opposite direction through an angle which is the same as or proportional to this angular displacement.

All of this structure is mounted in a casing comprising on the front face a transparent screen at the centre of which is a schematic aircraft silhouette. An artificial horizon is schematically represented on the display spherical barrel by an arc of a great circle disposed in a plane containing the longitudinal axis of symmetry of the spherical barrel. The arrangement is such that when the aircraft is flying straight and level the schematic silhouette of the aircraft on the transparent face of the casing coincides with the artificial horizon.

In operation, as is well known, the artificial horizon takes up, in real time, a position relative to the schematic aircraft silhouette on the front of the casing which correpsonds substantially to the position of the aircraft in space.

Thus when the aircraft is in a neutral attitude relative to its roll axis the position of the silhoutte relative to the artificial horizon line provides an indication of the longitudinal attitude of the aircraft. Likewise, when the aircraft has a neutral attitude relative to its pitch axis, the position of the silhouette relative to the artificial horizon line represents the attitude of the aircraft relative to its roll axis. If the aircraft performs a combined motion about its pitch and roll axes the position of the silhouette relative to the artificial horizon line continues to represent the substantial position of the aircraft relative to the horizon.

This type of gyroscopic artificial horizon has been found extremely beneficial in use and in particular is serving as a back-up artificial horizon in a very large number of aircraft equipped for operation under instrument flight rules.

This artificial horizon can be used as a back-up instrument in the event of failure of the power supply to the onboard instrumentation. When the power supply to the gyroscope motor fails, because of the high inertia of its rotating mass the gyroscope continues to rotate at high speed until residual friction causes it to stop rotating. As a general rule, the artificial horizon will continue to function for between five and ten minutes, giving the pilot an indication of the aircraft's attitude during this time interval.

Although the reliability of these gyroscopic artificial horizons has been proven, research and development has continued in this area with a view to simplifying the mechanical structure of the gyroscope in order to enhance the reliability of the gyroscopic artificial horizon and to reduce its manufacturing cost.

SUMMARY OF THE INVENTION

The present invention consists in a gyroscopic artificial horizon comprising a gimbal mount, a gyroscope suspended in said gimbal mount, which had an outer frame adapted to rotate about a first axis and an inner frame adapted to rotate relative to said outer frame about a second axis orthogonal to said first axis, a luminous display screen rotationally coupled to said outer frame, a sensor adapted to sense the angular position of said inner frame relative to said outer frame, which is representative of position in the space of the axis of said gyroscope, and a processor adapted to drive said luminous display screen to show a representation of said angular position as an artificial horizon.

The rotational coupling between the display screen and the outer frame makes it possible to simplify to a considerable degree the mechanical structure of gyroscopic artificial horizons and in particular those of the prior art as briefly described above. This results in greater reliability of the gyroscopic artificial horizon since the dynamic nature of the image generated by this instrument remains mechanical only in respect of roll motion whereas the dynamic representation of upward and downward movements relative to the horizon is generated by appropriate electronic means, to be described later. As a result, all parts associated with the display spherical barrel, or the equivalent of this component in other embodiments, are no longer needed. This saving in terms of parts is obviously reflected in financial savings.

In accordance with a particularly advantageous characteristic of the present invention the display screen may be of the liquid crystal type.

By virtue of this provision the screen may be made in a simple, convenient, reliable and, above all, economical way.

What is more, liquid crystals consume very little energy which is generally advantageous for any navigation instrument, all the more so in the case of a back-up instrument.

In a preferred embodiment, referred to herein as the simplified version, the display screen is of the dedicated liquid crystal type with at least some of the liquid crystals arranged to display parallel segments on the screen.

It should be noted here that the previously mentioned characteristics of the invention whereby the display screen is rotationally coupled to (or preferably constrained to rotate with) the outer frame within which the gyroscope is mounted makes it possible to solve other technical problems which have arisen during the research and development work previously mentioned and directed to improving the reliability of and simplifying the structure of gyroscopic artificial horizons.

Consideration has been given to using a fixed matrix type liquid crystal display, with two angular sensors provided to determine the spatial position of the axis of the gyroscope. Appropriate electronics would convert the signals from the sensors so that the spatial position of the gyroscope axis could be represented as an artificial horizon on the matrix screen.

It has now been realized that any such implementation would imply the use of a technology which at present is somewhat complicated, costly and unreliable.

Although a solution of this kind is initially attractive, it would entail the use of a very high resolution matrix screen and, so as to be able to show movement of the horizon in real time, an oblique line generator in the electronics.

At the present time the applicant is not aware of any commercially available liquid crystal matrix screen that is simple, cheap and of sufficient quality to be suitable for use in a flight instrument as important as the gyroscopic artificial horizon.

Such screens are clearly under development at present and it is to be expected that there will emerge onto the market reliable screens in which each point ("pixel") is switched by a thin-film transistor deposited onto the glass of the back surface of the screen. The applicant has already conducted tests on prototypes.

However, as mentioned above, the fixed screen solution implies the presence of an oblique line generator in the associated electronics. A generator is this kind has to incorporate a computer and a significant quantity of support electronics. It is well known that reliability (as indicated by the mean time between failure: MTBF) is inversely proportional to the number of components. The number of components required for the generator was found to be such that the predicted reliability was likely to be low for an instrument primarily used as a back-up. Also, the predicted power consumption was much too high.

Thus during the course of the previously mentioned research and development work the conclusion was arrived at that it would be preferable to avoid any use of an oblique lines generator and, at least in an early stage, a matrix type liquid crystal screen.

The general characteristics of the invention outlined above resolve this two-fold technical problem. The fact that the display screen is rotationally coupled to the outer frame makes it possible to dispense with the use of two angular sensors, the analytical processing of two angular signals and the generation of oblique lines. Only the angular position of the inner frame relative to the outer frame has to be determined, which can be achieved by means of single sensor, and this can be represented in the form of a horizon line on the rotating screen. This means that the electronic processor needs to function only in one dimension, which in particular eliminates the need for the computer mentioned above.

By using a dedicated liquid crystal screen, some at least of the liquid crystals being arranged to display parallel segments on the screen, it is possible to represent in a particularly simple way the rise and fall of the horizon line whereas rotation of the screen commensurately with rotation of the outer frame reflects rotation of the horizon line due to rolling motion of the aircraft.

In the final analysis, there is thus obtained a gyroscopic artificial horizon, the mechanical structure of which is particularly simplified, the dynamic image provided by which is advantageously luminous and reflects movements of the artificial horizon in a way that is at least as satisfactory as in the prior art, and the associated electronics of which are of particularly simple design.

Familiarity with the world of aeronautics has led the applicant to develop a second embodiment of the invention, referred to herein as the complete version.

In some cases it is necessary to complement the artificial horizon display (in the form of a horizon line) with other numerical or symbolic indications, for example: Fligth path, potential fligth path, bearing, approach path, etc.

To this end, in the complete version of the gyroscopic artificial horizon in accordance with the invention the display screen is of the matrix type. It is advantageously of the liquid crystal type and comprises a plurality of points ("pixels") switched by an associated transistor, this being of the thin-film type, for example, and deposited on the glass at the back of the screen.

Firstly, it should be noted that recent developments in matrix screens, especially with regard to reliability and resoltion, give grounds for predicting their adoption in civil and military aviation in the medium term.

The applicant has determined that by using a matrix screen of this type and appropriate electronics it is possible to animate complex symbols in an appropriate way. However, as the screen remains rotationally coupled to the outer frame of the gyroscope, there is no need to use an oblique line generator for real time animation of the artificial horizon line or any element of the associated symbols. Although the image of this complete version seems complicated as compared with that of the simplified version, the quantity of electronics necessary remains moderate and reliability is not compromised in a significant way.

During development of the gyroscopic artificial horizon which is the subject matter of this patent application the applicant was confronted with another technical problem in that customers are increasingly keen to obtain an artificial horizon of reduced longitudinal dimension as compared with those available on the market, at least in some specific applications.

Also, it can be desirable to be able to correct to some limited degree the representation of movement of the artificial horizon on the pitch axis. Such correction can be extremely beneficial for adequate representation of combined pitch and rolling motion, for example.

With the prior art gyroscopic artificial horizon described above any such correction is complicated because movements of the gyroscope axis are transmitted mechanically to the display barrel.

The present invention makes it possible to solve both of these technical problems since according to one of its characteristics the display screen is rotated by a motor slaved to the angular position of the outer frame of the gyroscope.

An arrangement like this makes it possible to achieve a significant saving in space longitudinally by virtue of the fact that it is possible, by avoiding a direct link between the outer frame of the gyroscope and the display screen, to offset the latter relative to said frame.

What is more, as the rotational coupling of the frame to the screen results from the control system it is possible to integrate either into the control electronics or into the electronics controlling movement of the artificial horizon on the screen (in the pitch direction), or in both, means which make it possible to "correct" the position of the artificial horizon in accordance with predetermined parameters.

In accordance with other characteristics of the invention a back-up battery is associated with the artificial horizon, and in a preferred embodiment this is of the cadmium-nickel type, the battery being inserted between the power supply to the instruments of the instrument panel and the processing device and the display screen.

As a result, should the power supply to the instruments of the instrument panel fail the processing device and the display screen continue to receive power from the back-up battery. Given that the power consumption of liquid crystals is notoriously low and that the simplified electronics consume little power, these items may be operated from a very low capacity battery during the period of time in which the gyroscope continues to function because of its high inertia. Thus the gyroscopic artificial horizon in accordance with the present invention may be used as a back-up artificial horizon in aircraft equipped for operation under instrument flight rules.

The charactristics and advantages of the present invention will emerge from the following description with reference to the appended drawings.

BRIEF DESCRIPTION OF THE DRAWINGS

FIG. 4 is a block diagram showing the interaction of various component parts of another embodiment of gyroscopic artificial horizon in accordance with the invention.

DESCRIPTION OF THE PREFERRED EMBODIMENTS

Figure 1:
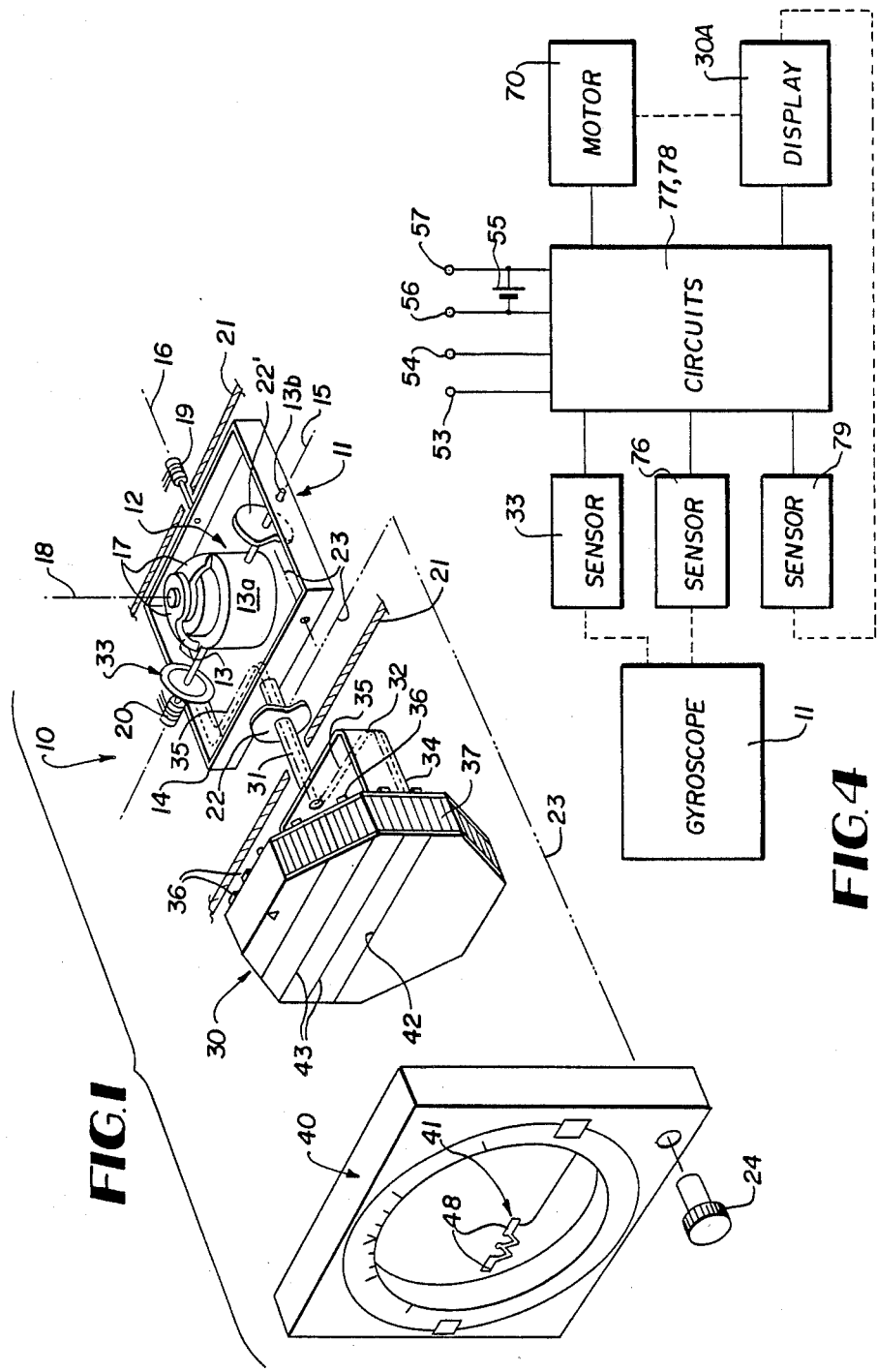
FIG. 1 is a schematic view in perspective of one embodiment of gyroscopic artificial horizon in accordance with the invention.

In the embodiment shown in FIG. 1, a gyroscopic artificial horizon 10 comprises a gyroscope system 11 the structure of which is known in itself.

The gyroscope system 11 comprises a gyroscope 12 suspended in a gimbal mount with two frames. A first of these is reduced in this instance to a pivot rod 13 attached to a structure 13a supporting the gyroscope 12. The second, or outer frame has the reference number 14.

It is seen that the two frames are articulated one within the other, about two orthogonal axes, the first of these being referred to as the "pitch axis" 15 and the second referred to the "roll axis" 16. The pivot rod 13 is articulated to the outer frame 14 by means of trunnions, one of which is visible in FIG. 1 and bears the reference number 13b. The outer frame 14 is mounted on and articulated in the conventional way to a support structure schematically designated at 21.

The gyroscope 12 comprises in the known way a motor which is not visible in this figure, this motor being driven in rotation at several thousand revolutions per minute about an axis 18 referred to as the gyroscope axis. Note that this axis 18 is orthogonal to the pitch axis 15.

The motor is supplied from an electrical power supply (not shown) via two components 19 and 20 respectively referred to as the roll collector and the pitch collector, these feeding the necessary electrical power to the gyroscope motor.

Erector means schematically represented as flyweights 17 are provided to orient the gyroscope axis 18 parallel to a vertical line through the place over which the aircraft, in which the gyroscope artificial horizon 10 is mounted, is flying.

Means for resetting the gyroscope on the basis of manual action by the pilot are provided on the roll axis (device 22) and on the pitch axis (device 22'). These resetting means are controled in the conventional way by a knob 24 operated by the pilot and operative on a device 23 schematically represented in FIG. 1.

Figure 2:
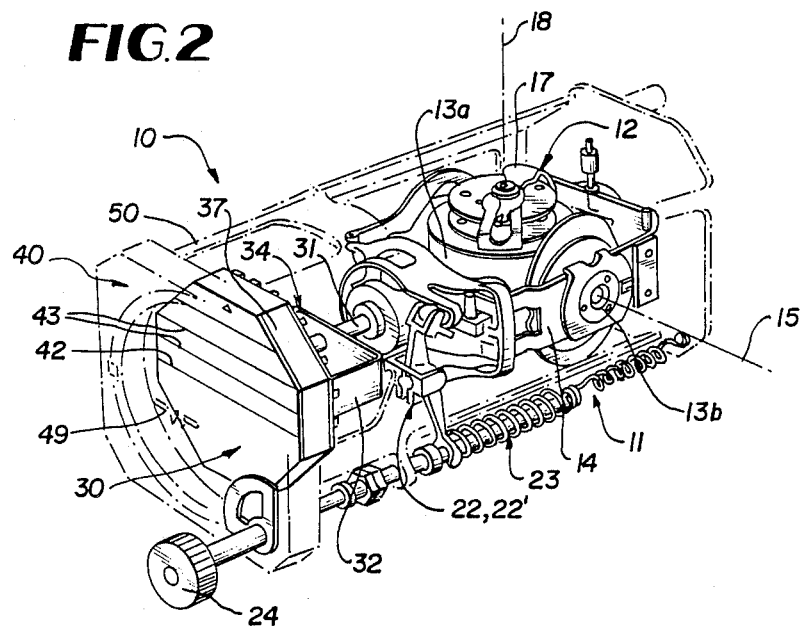
FIG. 2 is a schematic partially cut away perspective view showing the gyroscopic artificial horizon from FIG. 1 in more detail.

FIG. 2 shows the structure represented in FIG. 1 in more detail. Items from FIG. 1 visible in FIG. 2 carry the same reference numbers in both figures.

The gyroscope system 11, and in particular its component parts referenced 12 through 24 in the figures, are well known to those skilled in the art, especially since at the present time several thousand such systems are installed in civil and military aircraft of numerous nations.

Figure 3:
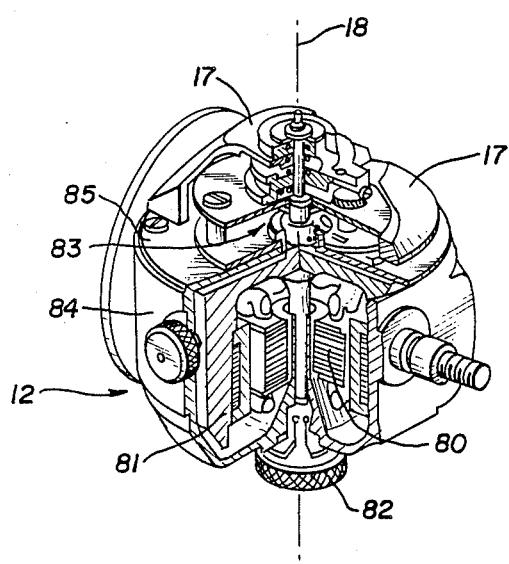
FIG. 3 is a partially cut away perspective view of a known type gyroscope.

In the conventional way, and as shown in FIG. 3, the gyroscope 12 comprises a motor having a fixed stator 80 and a rotor 81, generally called the "spinner" rotating about the axis 18 at a speed of 24 000 revolutions per minute, for example. The rotor is coupled to the erector flyweights 17 by a reducer 83 the reduction factor of which is such that the flyweights 17 rotate at 40 revolutions per minute, for example. A bowl 84 and a cover 85 serve as a casing. An unbalancing mass 82 is used for balancing along the axis 18.

As the structure and functioning of this gyroscope are well known it is not necessary to describe them here in more detail.

Reference will now be made to FIG. 2. Generally speaking, the gyroscopic artificial horizon 10 in accordance with the invention comprises a display screen 30 rotationally coupled to the outer frame 14.

In the embodiment shown the display screen 30 is a liquid crystal screen. To be more specific, in this instance dedicated liquid crystals are arranged, in accordance with another characteristic of the invention, to display parallel segments on the screen.

In the embodiment shown in FIGS. 1 and 2 the rotational coupling between the screen 30 and the outer frame 14 results from constraining the screen 30 to move with the outer frame 14. This is achieved in this instance by a shaft 31 coaxial with the roll axis 15 attached at one end to the outer frame 14 and at the other end to a bracket 32 supporting the screen 30.

Generally speaking, the gyroscopic artificial horizon in accordance with the invention comprises a sensor for sensing the angular position of the inner frame, in this instance the components 13 and 13a, relative to the outer frame 14. In the embodiment shown the sensor 33 comprises a potentiometer whose instantaneous resistance represents the angular position of the inner frame relative to the outer frame, in other words the angular position of the gyroscope axis 18 relative to the pitch axis 15.

Generally speaking, the gyroscopic artificial horizon comprises processing means adapted to display said angular position on the screen as an artificial horizon.

In the embodiment shown these processing means 34, some components 36 of which are visible in the figures, are electronic, the electronics 34 being connected to the potentiometer sensor 33 by cables schematically represented at 35.

It was previously stated that in the embodiment shown in FIGS. 1 and 2 the display screen 30 is a screen of dedicated type liquid crystals adapted to display parallel segments. It is seen in FIG. 1 that in a so-called neutral position the screen shows a dark portion delimited by a horizontal line and called the "horizon" 42 and a lighter portion comprising several lines 43 parallel to the horizon line 42. The lines 42 and 43 are parallel to the plane formed by the pitch axis 15 and the roll axis 16.

In the conventional way the artificial horizon 10 comprises a front panel module 40 designed to be placed on the instrument panel in view of the pilot. This module here comprises a circular viewing glass 49 at the center of which is an a-c mockup comprising two horizontal branches or wings 48. The knob 24 controlling the resetting device is disposed on the front panel 40.

It will be noted that in then embodiment shown the display screen 30 is octagonal, the connection between the liquid crystals and the electronics being made by means of a flexible film 37 disposed on the edge of the display screen. The viewing glass 42 has a diameter substantially less than the diametral distance between two sides of the octagon defining the display screen. Inside the front panel module 40 is a housing (not visible in the figures) enabling free rotation of the screen 30.

FIG. 2 shows some of the components shown in FIG. 1, namely the display screen 30, the shaft 31, the bracket 32, the electronics 34, the flexible film 37, the front panel 40 and the lines 42 and 43. A casing 50 containing all of the apparatus is partially shown in this figure. FIG. 2 shows the actual appearance of the apparatus in accordance with the present invention, whereas FIG. 1 is simplified to give a better idea of its functional structure.

The gyroscope system 11 functions in an entirely conventional way. The motor of the gyroscope 12 rotates at several thousand revolutions per minute. The gyroscope 12 has a carefully balanced mass. The axis 18 of the gyroscope assumes an orientation which it then retains.

In the conventional way the effect of the erector flyweights 17 is to align the axis 18 with the vertical line through the point over which the aircraft in which the gyroscopic artificial horizon 10 is mounted is flying.

The pilot can operate the resetting knob 24 to align the plane formed by the pitch axis 15 and the roll axis 16 of the gyroscopic artificial horizon 10 with the pitch axis and the roll axis of the aircraft. This is an entirely coventional operation and is needed when the aircraft has been maneuvered in a way that prevents the axis 18 maintaining its alignment with the vertical.

Generally speaking, the angular sensor 33 produces an output magnitude representative of the angular position of the inner frame relative to the outer frame, in other words of the position of the gyroscope axis 18 relative to the pitch axis 15. In the embodiment shown, in which the sensor 33 is of the potentiometer type, the output magnitude is a voltage proportional to the value of the angle.

The electronics 34 are adapted to process the information from the output of the sensor 33 and to display this information on the display screen 30 in the form of an artificial horizon. In practise the electronics 34 position the horizon line 42 on the screen 30 in such a way that when the aircraft is in horizontal flight the line 42 is parallel to the plane formed by the wings 48 of the model 41 and coincides with these.

As the display screen 30 is constrained to rotate with the outer frame 14 and the line 42 is parallel to the plane formed by the axes 15 and 16, the horizon line 42 is at all times perpendicular to the axis of the gyroscope 18 and consequently perpendicular to the vertical.

As the display screen 30 is free to rotate relative to the front panel module 40, which is fixed to the instrument panel of the aircraft in which the artificial horizon is mounted, the instantaneous angle between the plane of the wings 48 of the model 41 and the lines 42 and 43 is a real time representation of the lateral attitude of the aircraft.

To summarize, by virtue of the sensor 33 and the electronics 34 the position of the artificial horizon line 42 on the screen 30 is representative of the longitudinal attitude of the aircraft while the angular position of this line relative to the plane of the wings 48 of the a-c mockup 41 is representative of the lateral attitude of the aircraft.

The resulting gyroscropic artificial horizon is extremely beneficial because of its simplicity, since the attitude of the aircraft relative to its roll axis is indicated by mechanical means, whereas the attitude of the aircraft relative to its pitch axis is represented by electronic means that are particularly simple as they have to function in one dimension only (pitch angle in this case).

There will now be described with reference to FIGS. 4 through 6 an alternative embodiment of the gyroscopic artificial horizon in accordance with the invention. In these figures structural items similar to items in FIGS. 1 and 2 carry the same reference numbers.

The horizon 10A shown in FIG. 5 comprises a gyroscope system 11 of similar structure to that described with reference to FIGS. 1 and 2 and a display screen 30A coupled rotationally to the outer frame 14 of the gyroscope system 11.

The display screen 30A is rotatably mounted in the support structure 21 of the artificial horizon 10A. A plurality of guide rollers 62 are mounted on the structure 21, although only one of them is visible in FIG. 5 (this figure is partially cut away to provide a better illustration of certain characteristics of this embodiment of the gyroscopic artificial horizon in accordance with the invention).

Note that in this embodiment the display screen is circular and that the guide rollers 62 cooperate with the peripheral edge 63 of the screen in order to guide it.

The screen 30A is mounted on an axial arm 64 which is in turn mounted in a bearing 65 fitted into a vertical wall 66 of the support structure 21.

Near the peripheral guide edge 63 of the display screen 30A there is provided a toothed ring 68. This ring meshes with a gearwheel 69 connected by a reducer 67 to a display screen 30A roll positioning and drive motor 70.

A circuit 71 comprising circular tracks 72 centered on the rotation axis of the shaft 64 is attached to the screen 30A and cooperates with a brush circuit 73 mounted on the wall 66 to provide a current collector between the mobile screen 30A and the fixed structure 21, one of these tracks constituting a potentiometer to form an angular position sensor for screen rotation control purposes.

Another angular position sensor is mounted at the rear of the gyroscope system 11. It comprises a circuit 74 with circular plastics tracks attached to the gyroscope system 11 cooperating with a brush circuit 75 (not visible in the figure) mounted on the fixed structure 21.

This sensor is adapted to produce a signal representative of the angular position of the outer frame 14 relative to a neutral reference position. This sensor 76 is a so-called roll sensor.

A sensor for sensing the angular position of the inner frame 13 and 13b relative to the outer frame 14 (pitch sensor) is also provided and is disposed as described with reference to FIGS. 1 and 2, together with roll and pitch collectors.

In this embodiment electronic circuits 77 and 78 are disposed respectively behind and above the gyroscope system 11, the components of the circuit 78 having been omitted to clarify the drawing.

Figure 6:
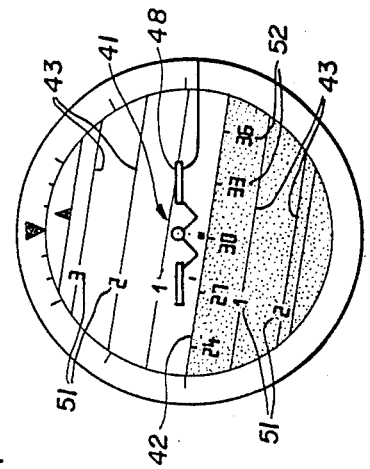
FIG. 6 is a view of the display screen of the gyroscopic artificial horizon shown in FIG. 5.

FIG. 6 shows the display screen 30A which is of the liquid crystal matrix type in this embodiment.

At this time the applicant is considering the use of a screen comprising a multitude of points or "pixels" switched by an associated transistor of the thin-film type deposited onto the glass at the back of the screen. Any other matrix screen type that exists already or is yet to be developed may suit, of course.

Note that a series of figures are indicated on the screen. Thus the level lines 43 carry numerical references 51. Parameters 52 representative of the bearing followed by the aircraft in which the gyroscopic artificial horizon 10A is mounted are shown beneath the artificial horizon line 42.

There will now be described with reference to FIG. 4, which is a block diagram, how the various components shown in FIG. 5 interact. In this figure interaction of a physical or mechanical nature is schematically represented in dashed line whereas the flow of electrical information is schematically represented in full line.

There is seen to the left of the figure the gyroscope system 11. The angular position of the inner frame relative to the outer frame is measured by the roll sensor 33 while the angular position of the outer frame relative to a fixed reference position (that of the plane defined by the pitch and roll axes of the aircraft) is measured by the roll sensor 76. Information is fed from this potentiometer sensor to the input of electronic circuits 77 and 78. The input of these circuits also receives information from the sensor 79 which measures the angular position of the display screen 30 relative to the same neutral position, this sensor comprising a plastics track 72 and a brush 73.

The circuits 77 and 78 output control information for the motor 70 and information for display on the screen 30A. This figure also represents schematically the interaction of the motor 70 and of the screen 30A through the intermediary of the reducer 67, the gearwheel 69 and the toothed ring 68.

The circuits 77 and 78 are also connected to various equipment units of the aircraft, receiving various information via their terminals 53 and 54 (flight path, potential flight path, bearing, approach trajectory, etc).

In this embodiment a back-up battery 55 is provided and disposed between the two power supply terminals 56 and 57 of the electronic circuits 77 and 78 and of the motor 70. In normal operation the terminals 56 and 57 are connected to the power supply for the instrument panel instruments by safety circuits that are known in themselves.

The gyroscopic artificial horizon shown in FIGS. 4 and 5 operates in the following way:

The rotational coupling of the outer frame to the display screen 30A is acheived by the servomotor 70 and the associated electronics 77 and 78. The sensor 76 measures the angular position of the outer frame 14 in real time. There is therefore at the output of this sensor 76 a signal representing this angular position. Similarly, at the output of the sensor 79 there is a signal representative of the angular position of the display screen 30A. An error signal is generated in the electronics 77 and 78 and is operative through electronic control circuits that are entirely conventional on the motor 70.

The angular position of the display screen 30A is thus representative in real time of the angular position of the outer frame 14 and, as a consequence of this, the angle of roll of the aircraft.

The electronics are adapted to switch the set of "pixels" of the display screen 30A. This generates the various symbols shown in FIG. 6.

As in the embodiment shown in FIGS. 1 and 2 the output signal from the sensor 33 and the electronics 77 and 78 position the artificial horizon relative to the pitch axis.

The information present on terminals 53 and 54 is processed by the electronics 77 and 78 and displayed on the screen 30A in symbol form.

Note that the electronics 77 and 78 may advantageously be adapted to correct the information output by the pitch sensor 33 and the roll sensor 76 to allow for possible combined movements of the aircraft about both axes. In this case, the information transmitted to the display screen and/or to the drive motor may be corrected to take account of such combined movements. A facility of this kind will evidently be much appreciated by pilots.

It should be noted that, despite the apparent complexity of the electronics 77 and 78 in the embodiments currently being described, the fact that the screen 30A is rotationally coupled by the servomotor 70 to the outer frame 14 of the gyroscope system 11 makes it possible to dispense with the use of a complex processor such as would have been necessary to generate oblique lines on the display screen in real time.

This characteristic of the invention avoids the need to generate such oblique lines and so eliminates the need to use a processor of this kind.

It will also be noted that for positioning the horizon line 42 and the graduation lines 43 on the screen in real time the electronics 77 and 78 need to process the signal from the pitch sensor 33 in one dimension only.

Figure 5:
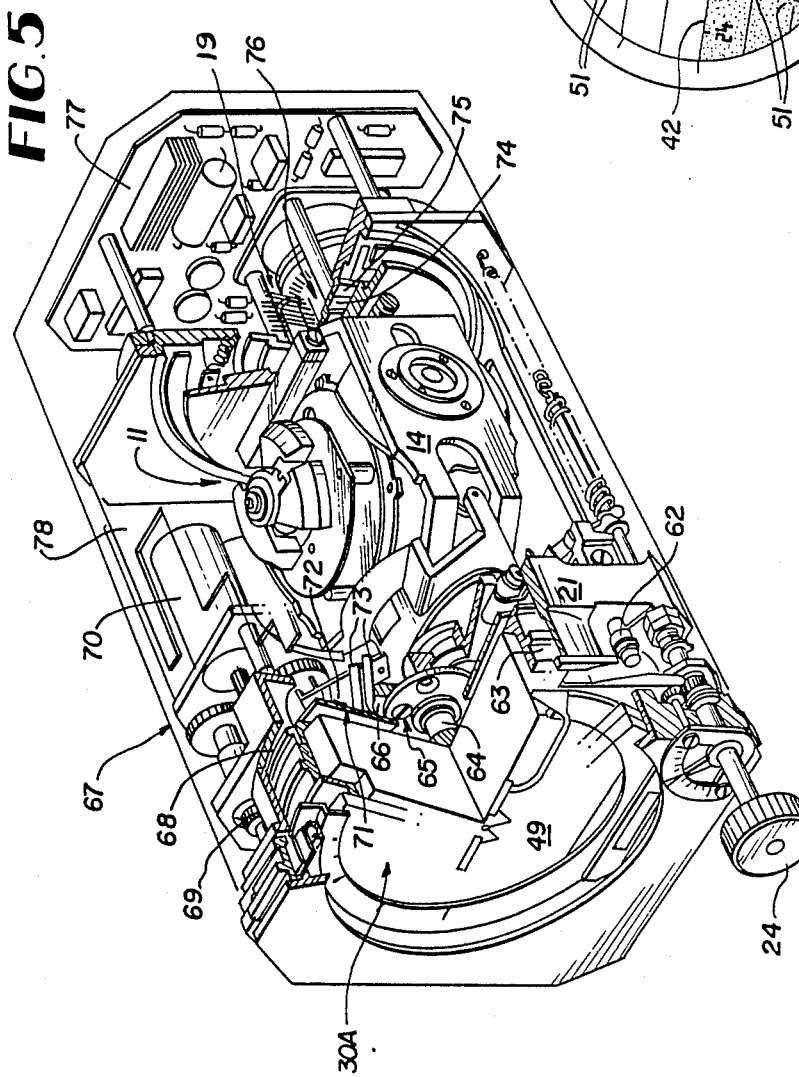
FIG. 5 is a partially cut away schematic perspective view of this other embodiment.

It will also be noted that the embodiment shown in FIG. 5 has a substantially smaller longitudinal dimension than that shown in FIG. 2, because of the decoupling of the outer frame 14 from the screen 30A.

Finally, it will be noted that the battery 55, which is a cadmium-nickel battery in the embodiment shown, makes it possible to supply power to the electronics 77 and 78 and to the motor 70 should the main power supply at terminals 56 and 57 fail. This provides power for a time interval (of approximately 10 minutes) during which the gyroscope 12 continues to function through inertia. Thus the artificial horizon 10A from FIG. 5 (and also the artificial horizon 10 from FIGS. 1 and 2 if a back-up battery is added to them in this way) may advantageously serve as a back-up gyroscopic artificial horizon.

It is to be understood that the present invention is in no way limited to the embodiments described and shown, but encompasses all variants thereof.

Thus any equivalent display means may be substituted for the liquid crystal display screen.

Similarly, it is possible to use in the embodiment described with reference to FIG. 5 a dedicated liquid crystal type screen or to use in the embodiment described with reference to FIG. 2 a matrix type display screen, with the attendant advantages.

Information of any kind may be processed by the electronics 77 and 78 and displayed on the screen 30 or 30A, given the nature of these screens.

Any type of servomotor and control circuit can be used, or course. Also, the screen 30A may be driven by devices other than the reducer 67, the toothed ring 68 and the gearwheel 69.

There is claimed:

1. Gyroscopic artificial horizon comprising a gimbal mount mounted in a support structure, a gyroscope suspended in said gimbal mount, said gimbal mount having an outer frame adapted to rotate about a first axis and an inner frame adapted to rotate relative to said outer frame about a second axis orthogonal to said first axis, a luminous display screen rotationally coupled to said outer frame for displaying an angular position of said outer frame relative to said support structure, a sensor disposed either on the inner or the outer frame for sensing the angular position of said inner frame relative to said outer frame, and a processor adapted to drive said luminous display screen to show said angular position of said inner frame relative to said outer frame as an artificial horizon.

2. Gyroscopic artificial horizon according to claim 1, wherein said display screen is constrained to rotate with said outer frame.

3. Gyroscopic artificial horizon according to claim 1, wherein said display screen is a liquid crystal display screen.

4. Gyroscopic artificial horizon according to claim 3, wherein said display screen is of the dedicated liquid crystal type and at least some of the liquid crystals thereof are arranged to form parallel segments on said display screen.

5. Gyroscopic artificial horizon according to claim 1, wherein said display screen is a matrix display screen.

6. Gyroscopic artificial horizon accoring to claim 5, wherein said matrix display screen comprises a plurality of pixels and a respective switching transistor for each pixel of the thin-film type deposited onto the rear surface of said screen.

7. Gyroscopic artificial horizon according to claim 1, further comprising a motor adapted to rotate said display screen and a control system adapted to sense the angular position of said outer frame of said gimbal mount relative to said structure and to operate said motor according to said angular position of said outer frame.

8. Gyroscopic artificial horizon according to claim 1, further comprising a back-up battery.

9. Gyroscopic artificial horizon according to claim 8, wherein said battery is a nickel-cadmium battery.

10. Gyroscopic artificial horizon according to claim 7, wherein said control system comprises a first sensor for sensing the angular position of said outer frame relative to said structure and said motor is connected to an output of said sensor and to said display screen for driving said display screen.

11. Gyroscopic artificial horizon according to claim 10, wherein said control system further comprises a second sensor for sensing the position of the display screen and for transmitting to said motor a signal representative of said sensed position to thereby provide feedback control of said motor.

* * * * *